United States Patent Office 2,882,266
Patented Apr. 14, 1959

2,882,266

COPPER CONTAINING DISAZO DYESTUFFS OF THE STILBENE SERIES

Ernst Keller, Binningen, Basel-Land, and Rudolf Durig, Basel, Switzerland, and Fritz Mindermann, Grenzach, Baden, Germany, assignors to J. R. Geigy A.-G., Basel, Switzerland, a Swiss firm No Drawing. Application December 4, 1956
Serial No. 626,084

Claims priority, application Switzerland December 16, 1955

5 Claims. (Cl. 260—146)

The invention concerns substantive disazo dyestuffs of the stilbene series, their production and their use for the dyeing of cellulose or of material containing cellulose in fast to light green to olive green shades. It also concerns, as industrial product, the material dyed with the aid of these dyestuffs.

It has been found that valuable substantive disazo dyestuffs are obtained when an amino monoazo dyestuff of the general Formula I

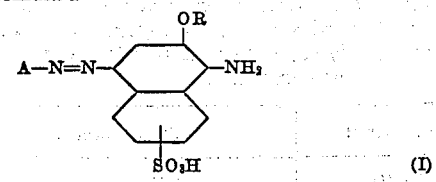

(I)

wherein A represents the radical of a 4-[4.5-naphtho-1.2.3-triazolyl-(2)]-stilbene-2.2'-disulphonic acid bound to the azo group in the 4'-position, and R represents a low molecular alkyl group which may possibly be substituted, is diazotised, coupled with a 2-acylamino-6-hydroxynaphthalene-8-sulphonic acid and the disazo dyestuff so obtained is converted by treatment with agents giving off copper into the corresponding complex copper compound.

The amino monoazo dyestuffs of the general Formula I used in the process according to the present invention are obtained by coupling diazotised 4'-amino-4-[4.5-naphtho-1.2.3-triazolyl-(2)]-stilbene-2-.2'-disulphonic acids with 1-amino-2-alkoxynaphthalene monosulphonic acids. Advantageous examples of the latter are 1-amino-2-alkoxy-naphthalene-6-sulphonic acids having low molecular substituted or unsubstituted alkyl groups, e.g. the methyl, ethyl, or carboxy methyl radical.

The 4'-amino-4-[4.5-naphtho-1.2.3-triazolyl-(2)]-stilbene-2.2'-disulphonic acids used as starting materials in the production of the amino monoazo dyestuffs of the general Formula I are known, or they can be produced by methods known per se. For example, diazotised 4-nitro-4'-aminostilbene-2.2'-disulphonic acid is coupled with an azo component coupling in the o-position to a primary amino group, the o-amino monoazo dyestuff formed is oxidised to form the 1.2.3-triazole compound and the nitro group is reduced to the amino group.

Aminonaphthalene compounds such as e.g. 2-aminonaphthalene, 2-aminonaphthalene-1-, -5-, -6-, -7-, or -8-monosulphonic acid, 1-aminonaphthalene-3- or -4-sulphonic acid, 2-aminonaphthalene-3.6- or -5.7- or -6.8-disulphonic acid can be used as azo components coupling in the o-position to a primary amino group.

N-acyl derivatives of 2-amino-6-hydroxynaphthalene-8-sulphonic acid can be used as azo components to be coupled with the diazo compound of the amino monoazo dyestuff of the general Formula I, the acyl radical of which can be derived from organic sulphonic acids and, advantageously, from organic carboxylic acids or derivatives of carbonic acid. The preferred N-acylamino compounds can contain radicals of aliphatic or aromatic carboxylic acids or of carbonic acid half esters. This also includes the derivatives further substituted in the aliphatic or aromatic radicals. Examples are: 2-acetylamino-6-hydroxynaphthalene-8-sulphonic acid, 2-carbomethoxy-amino-6-hydroxynaphthalene-8-sulphonic acid, 2-sulpho-acetylamino-6-hydroxynaphthalene-8-sulphonic acid, 2-benzoylamino-6-hydroxynaphthalene - 8 - sulphonic acid and, as an example of derivatives substituted in the aromatic radical, 2-(m- and p-aminobenzoylamino)-6-hydroxynaphthalene-8-sulphonic acids. However, also a 2-alkyl sulphonylamino-6-hydroxynaphthalene-8-sulphonic acid for example can be used.

The disazo dyestuffs of the stilbene series produced in this manner are coppered by methods known per se, advantageously in aqueous solution or suspension at a raised temperature, by treatment with agents giving off copper.

A modification of the order in which the dyestuffs according to the present invention are built up consists in diazotising an amino monoazo dyestuff of the general Formula II

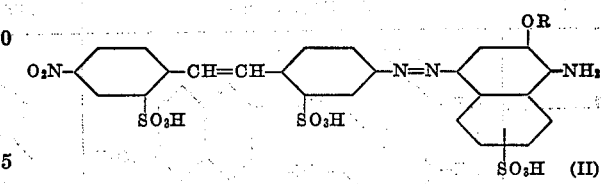

(II)

wherein R has the meaning given above, then coupling the diazo compound with a 2-acylamino-6-hydroxynaphthalene-8-sulphonic acid, reducing the nitro group to the amino group and then coupling the amino disazo dyestuff obtained, after diazotisation, with an azo component coupling in the o-position to a primary amino group. The triazole ring is then closed and the copper complex formed, it being posisble to perform both these reactions in one step, e.g. by treatment with ammoniacal copper sulphate solution.

In their non-copper containing form, the disazo dyestuffs which are produced according to the present invention correspond to the general Formula III

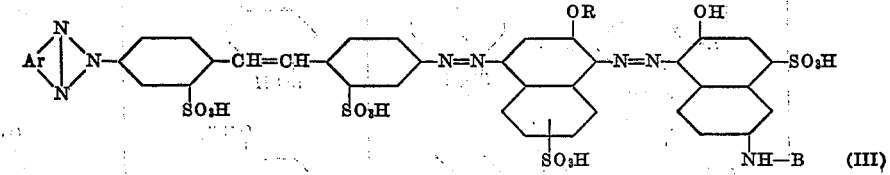

(III)

In this formula: Ar represents a naphthalene radical which is bound to the nitrogen atoms by two C atoms next to each other in the nucleus, B represents an acyl radical and preferably the substituent —COD, wherein D is a possibly further substituted alkyl, alkoxy or aryl group, and R represents a low molecular alkyl radical which may possibly be substituted.

In the form of their alkali salts, e.g. the lithium, sodium, potassium or ammonium salts, the cupriferous disazo dyestuffs according to the present invention are dark coloured, water soluble powders. They dye cellulose or material containing cellulose from a bath containing Glauber's salt in green to olive green shades which have good fastness to light.

The following examples illustrate the invention without limiting it in any way. Where not otherwise stated, parts are given as parts by weight and the temperatures are in degrees centigrade. The relationship of parts by weight to parts by volume is as that of kilogrammes to litres.

*Example 1*

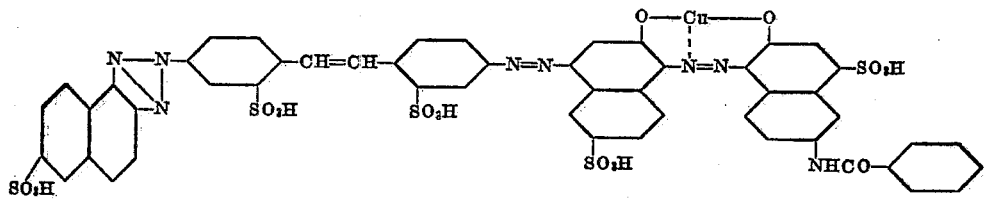

132 parts of 4-nitro-4'-aminostilbene-2.2'-disulphonic acid are diazotised in the usual way and coupled in an acetic acid solution with 76 parts of 2-aminonaphthalene-6-sulphonic acid. The monoazo dyestuff formed is precipitated with sodium chloride, isolated and again dissolved in water. It is then converted by treatment with 410 parts of 12% sodium hypochlorite solution in the presence of 26.5 parts of sodium carbonate at a temperature of 50–60°, into the triazole compound. The triazole compound is precipitated with sodium chloride, isolated and the nitro group is reduced in the usual way with iron and hydrochloric acid to the amino group.

86 parts of the 4'-amino-4-[6'-sulphonaphtho-1'.2':4.5-triazolyl-(2)]-stilbene-2.2'-disulphonic acid so obtained are diazotised and coupled in a soda alkaline solution with 38 parts of 1-amino-2-methoxynaphthalene-6-sulphonic acid. This aminoazo dyestuff is further diazotised and the diazo compound is coupled with 51.4 parts of 2-benzoylamino-6-hydroxynaphthalene-8-sulphonic acid in the presence of pyridine. The disazo dyestuff so obtained is isolated. To convert it into the complex copper compound, it is dissolved in water and boiled for 12 hours in the presence of sodium acetate with 25 parts of copper sulphate. After drying, the completely coppered dyestuff is a dark powder which dissolves in water with a blue-green colour and it draws on to cotton and regenerated cellulose fibres from an aqueous bath in full green shades. The dyeings have very good fastness to light and the shade and fastness to light are only very slightly affected by after-crease processing.

Further dyestuffs are given in the table below which are obtained in a similar manner, i.e. by diazotising the amino azo dyestuffs obtained from columns 1 and 2 and coupling with the end components shown in column 3 and finally converting the free forms into the corresponding copper complexes.

| No. | Starting component | Middle component | End component | Shade |
|---|---|---|---|---|
| 1 | | | | Green. |
| 2 | | | | Do. |
| 3 | | | | Do. |
| 4 | | | | Do. |
| 5 | | | | Do. |

| No. | Starting component | Middle component | End component | Shade |
|---|---|---|---|---|
| 6 | (structure) | (structure) | (structure) | Green. |
| 7 | (structure) | (structure) | (structure) | Do. |
| 8 | (structure) | (structure) | (structure) | Do. |
| 9 | (structure) | (structure) | (structure) | Do. |
| 10 | (structure) | (structure) | (structure) | Do. |
| 11 | (structure) | (structure) | (structure) | Do. |
| 12 | (structure) | (structure) | (structure) | Do. |
| 13 | (structure) | (structure) | (structure) | Do. |
| 14 | (structure) | (structure) | (structure) | Do. |

Example 2

2 parts of the dyestuff obtained according to Example 1 are dissolved in a dyebath containing 3000 parts of water and 1 part of soda. 100 parts of cotton are entered at 40–50°, the bath is heated to 90–95° within 30 minutes, 30 parts of sodium sulphate are added and dyeing is continued for 45 minutes at this temperature. After this time, the dyed goods are rinsed cold in the usual way and dried. In this manner the cotton is dyed in green shades which have good wet fastness and very good light fastness properties.

What we claim is:

1. The complex copper compound of a disazo dyestuff having the general formula:

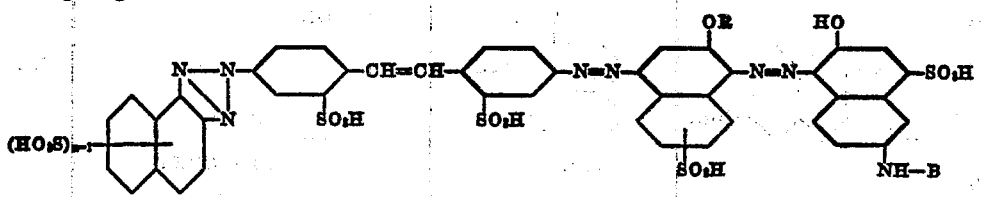

wherein R represents a member selected from the group consisting of $CH_3$ and $-CH_2COOH$, B represents a member selected from the group consisting of lower alkylcarbonyl, lower alkoxycarbonyl, lower alkylsulfonyl and phenylcarbonyl radicals, and $n$ is one of the numerals 1 and 2.

2. The complex copper compound of a disazo dyestuff having the formula:

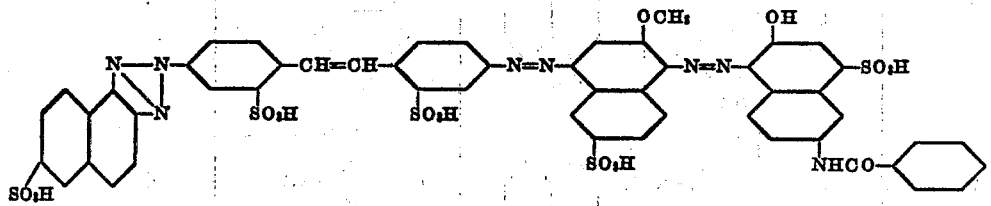

3. The complex copper compound of a disazo dyestuff having the formula:

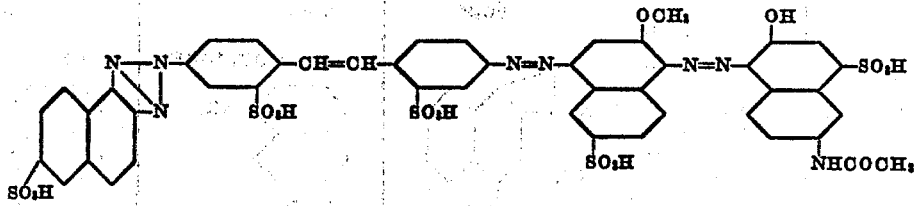

4. The complex copper compound of a disazo dyestuff having the formula:

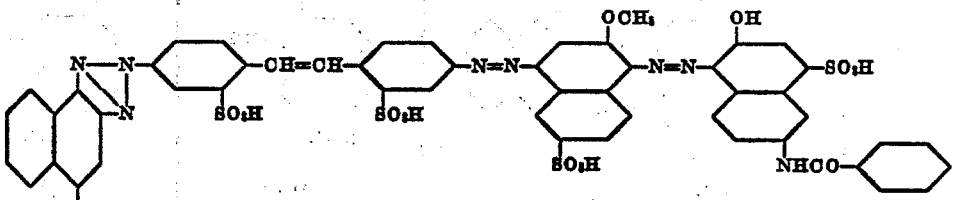

5. The complex copper compound of a disazo dyestuff having the formula:

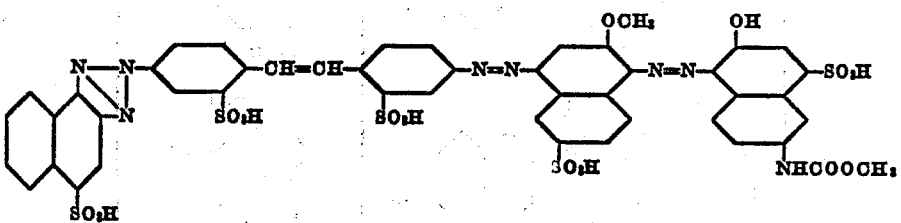

References Cited in the file of this patent
UNITED STATES PATENTS
2,175,552   Schindhelm et al. _____ Oct. 10, 1939